UNITED STATES PATENT OFFICE.

JOSEPH WILLIAMS, OF SHARPSBURG, PENNSYLVANIA.

IMPROVEMENT IN LUBRICATING COMPOUNDS.

Specification forming part of Letters Patent No. 164,117, dated June 8, 1875; application filed May 11, 1875.

*To all whom it may concern:*

Be it known that I, JOSEPH WILLIAMS, of Sharpsburg, in the county of Allegheny and State of Pennsylvania, have invented a new and useful Improvement in Lubricating Compound; and I do hereby declare that the following is a full and exact description thereof.

The nature of my invention consists in a lubricating compound composed of tallow or other grease, oil refuse, sulphur, black-lead, lime-water, prepared in about the proportions hereinafter specified, and mixed together so as to form a homogeneous compound.

To enable others skilled in the art to make my lubricating compound, I will proceed to describe more fully the manner of preparing it: I take thirty parts of tallow or other grease and melt it. I then take thirteen parts of sulphur and nine parts of lime-water, and mix them together, and add them to the melted tallow and boil them together. To this mass I add twenty-eight parts of oil refuse (residuum) and five parts of fire-clay or potter's clay, finely powdered, and thoroughly boil the whole together. After being sufficiently boiled, I remove the fire and add fifteen parts of black-lead, care being taken to keep stirring the mass until it is sufficiently cool to congeal.

The lubricating compound hereinbefore described will be found useful for all things requiring lubrication, being free from grit, very durable, and cheap.

Having thus described my improvement, what I claim as of my invention is—

A lubricating compound composed of tallow, sulphur, lime, oil, black-lead, potter's clay or fire-clay, substantially as described.

JOSEPH WILLIAMS.

Witnesses:
A. C. JOHNSTON,
B. L. JOHNSTON.